(12) United States Patent
Giebel et al.

(10) Patent No.: US 9,016,579 B2
(45) Date of Patent: Apr. 28, 2015

(54) APPARATUS FOR AND METHOD OF ELECTRO-OPTICALLY READING A TARGET IN THE PRESENCE OF AMBIENT LIGHT

(71) Applicant: Symbol Technologies, Inc., Schaumburg, IL (US)

(72) Inventors: James R. Giebel, Centerport, NY (US); Edward D. Barkan, Miller Place, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 145 days.

(21) Appl. No.: 13/900,611

(22) Filed: May 23, 2013

(65) Prior Publication Data
US 2014/0346232 A1 Nov. 27, 2014

(51) Int. Cl.
*G06K 7/10* (2006.01)

(52) U.S. Cl.
CPC ........ *G06K 7/10831* (2013.01); *G06K 7/10554* (2013.01)

(58) Field of Classification Search
USPC ............................ 235/462.06, 462.29, 462.32
See application file for complete search history.

(56) References Cited

U.S. PATENT DOCUMENTS

| | | | |
|---|---|---|---|
| 4,303,855 A | 12/1981 | Bapst et al. | |
| 5,852,286 A * | 12/1998 | Coleman | 235/462.01 |
| 6,705,525 B2 | 3/2004 | Krichever et al. | |
| 8,006,905 B2 | 8/2011 | Jolivet et al. | |
| 8,087,589 B2 | 1/2012 | Heinrich et al. | |
| 8,207,676 B2 | 6/2012 | Hilgers | |
| 8,248,467 B1 | 8/2012 | Ganick et al. | |

* cited by examiner

*Primary Examiner* — Daniel Hess
(74) *Attorney, Agent, or Firm* — Nong-Qiang Fan (57) ABSTRACT

A reader for electro-optically reading a target in the presence of ambient light, includes a scan component for scanning a laser beam across the target, a first filter for passing return laser light from the target and the ambient light to a first photodetector system for generating a first output signal constituted of an information signal and a first ambient light signal, a second filter for passing the ambient light to a second photodetector system for generating a second output signal constituted of a second ambient light signal, and signal processing circuitry for measuring a difference between the first and second ambient light signals, for equalizing the first and second ambient light signals when the difference exceeds a threshold, and for subtracting the second output signal from the first output signal to obtain a receiver output signal substantially constituted only of the information signal.

15 Claims, 6 Drawing Sheets

APPARATUS FOR AND METHOD OF ELECTRO-OPTICALLY READING A TARGET IN THE PRESENCE OF AMBIENT LIGHT

FIELD OF THE DISCLOSURE

The present disclosure relates generally to an apparatus for, and a method of, electro-optically reading a target in the presence of ambient light and, more particularly, to removing the effects of ambient light, especially when emitted from fluorescent lamps and light emitting diodes (LEDs) operated at kilohertz frequencies.

BACKGROUND

Moving laser beam readers or laser scanners have long been used as data capture devices to electro-optically read targets, such as one-dimensional bar code symbols, particularly of the Universal Product Code (UPC) type, printed on labels associated with products in many venues, such as supermarkets, warehouse clubs, department stores, and other kinds of retailers, as well as many other venues, such as libraries and factories. The moving laser beam reader generally includes a housing, a laser for emitting a laser beam, a focusing lens assembly for focusing the laser beam to form a beam spot having a certain size at a focal plane in a range of working distances relative to the housing, a scan component for repetitively scanning the beam spot over a scan angle across a target in a scan pattern, for example, a scan line or a series of scan lines, across the target multiple times per second, and a detector for detecting return light reflected and/or scattered from the target and for converting the detected return light into an analog electrical information signal bearing information related to the target. This analog electrical information signal varies in amplitude as a function of time due to the time-varying return light along each scan line, and varies in frequency as a function of the density of the symbol, as well as the distance at which the symbol is being read. The moving laser beam reader also includes signal processing receiver circuitry including a digitizer for digitizing the variable analog information signal, and a microprocessor for decoding the digitized signal based upon a specific symbology used for the target. The decoded signal identifies the product and is transmitted to a host, e.g., a cash register in a retail venue, for further processing, e.g., product price look-up or product inventorying.

In one advantageous embodiment, during operation of the moving laser beam reader in a venue having one or more external light sources that emit ambient light, an operator holds the housing in his or her hand, and aims the housing at the target, and then initiates the data capture and the reading of the target by manual actuation of a trigger on the housing. The ambient light is also concomitantly detected by the detector, which generates an analog electrical ambient light signal. In the event that the external source is sunlight, then the ambient light is substantially constant in magnitude, and therefore, the analog electrical ambient light signal has a constant illumination DC component. In the event that the external source is an incandescent bulb or a fluorescent lamp energized at 50 Hz or 60 Hz, then the analog electrical ambient light signal has a constant illumination DC component and a relatively small time-varying AC frequency component at 50 Hz or 60 Hz. In the event that the fluorescent lamp is operated at higher frequencies for greater luminous efficiency, or in the event that the external source includes light emitting diodes (LEDs) operated at higher frequencies, then the analog electrical ambient light signal has a constant illumination DC component and a relatively larger time-varying AC frequency component at kilohertz frequencies, typically anywhere from 30 kHz to 300 kHz.

In some circumstances, the presence of the ambient light signal interferes with, and weakens, the information signal. For example, the magnitude of the ambient light signal might be too large when compared to the magnitude of the information signal. To prevent interference, the constant illumination DC component of the ambient light signal can generally be filtered out from the information signal. Also, filters can be used to suppress the ambient light signal when its time-varying frequency component is very far in frequency away from the frequency of the information signal. However, if the time-varying frequency component of the ambient light signal is too close in frequency to the frequency of the information signal, then the ambient light signal can interfere and impede the decoding of the information signal, thus degrading the performance of the reader. By way of non-limiting example, an information signal of about 50 kHz and its harmonic at about 100 kHz can be generated during reading of a low density symbol located relatively close to the reader, e.g., about 10 inches away. If the ambient light source includes LEDs operated to have a frequency of about 100 kHz, then the 100 kHz frequencies of the ambient light signal and the information signal are too close and will cause an interference, and perhaps cause the symbol not to be successfully decoded and read.

Accordingly, there is a need to remove such interference caused by such ambient light to enhance reader performance.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

One aspect of this disclosure relates to a reader for electro-optically reading a target, e.g., a bar code symbol, in the presence of ambient light. The reader includes a laser, typically a semiconductor laser diode, for emitting a laser beam, and a scan component for scanning the laser beam across the target for reflection and scattering therefrom as return laser light. The reader further includes a first filtering system for passing the return laser light from the target and the ambient light, and a first photodetector system for receiving the return laser light and the ambient light passed by the first filtering system, and for generating a first analog electrical output signal constituted of an information signal bearing information related to the target from the return laser light, and a first ambient light signal from the ambient light. The reader still further includes a second filtering system for passing the ambient light, and a second photodetector system for receiving the ambient light passed by the second filtering system, and for generating a second analog electrical output signal constituted of a second ambient light signal from the ambient light. The reader also includes signal processing circuitry including a controller, e.g., a microprocessor, for measuring a difference between the first and second ambient light signals. The signal processing circuitry is operative for substantially equalizing the first and second ambient light signals when the difference exceeds a threshold, and for subtracting the second output signal from the first output signal when the first and second ambient light signals are equalized to obtain a receiver output signal substantially constituted only of the information signal.

The laser beam has a laser frequency. Advantageously, the first filtering system has a first optical filter having a frequency passband for passing the laser frequency and a frequency of the ambient light, and the second filtering system has a second optical filter having a frequency passband for attenuating the laser frequency and for passing the frequency of the ambient light. Preferably, the first optical filter overlies the first and second photodetector systems, and the second optical filter only overlies the second photodetector system. The optical filters and the photodetector systems are supported by a substrate and constitute an electro-optical assembly.

A method, in accordance with another aspect of this disclosure, of electro-optically reading a target in the presence of ambient light, is performed by emitting a laser beam from a laser, by scanning the laser beam across the target for reflection and scattering therefrom as return laser light, by passing the return laser light from the target and the ambient light through a first filtering system, by receiving the return laser light and the ambient light passed by the first filtering system at a first photodetector system, by generating from the first photodetector system a first analog electrical output signal constituted of an information signal bearing information related to the target from the return laser light, and a first ambient light signal from the ambient light, by passing the ambient light through a second filtering system, by receiving the ambient light passed by the second filtering system at a second photodetector system, by generating from the second photodetector system a second analog electrical output signal constituted of a second ambient light signal from the ambient light, by measuring a difference between the first and second ambient light signals, by substantially equalizing the first and second ambient light signals when the difference exceeds a threshold, and by subtracting the second output signal from the first output signal when the first and second ambient light signals are equalized to obtain a receiver output signal substantially constituted only of the information signal.

Figure 1:
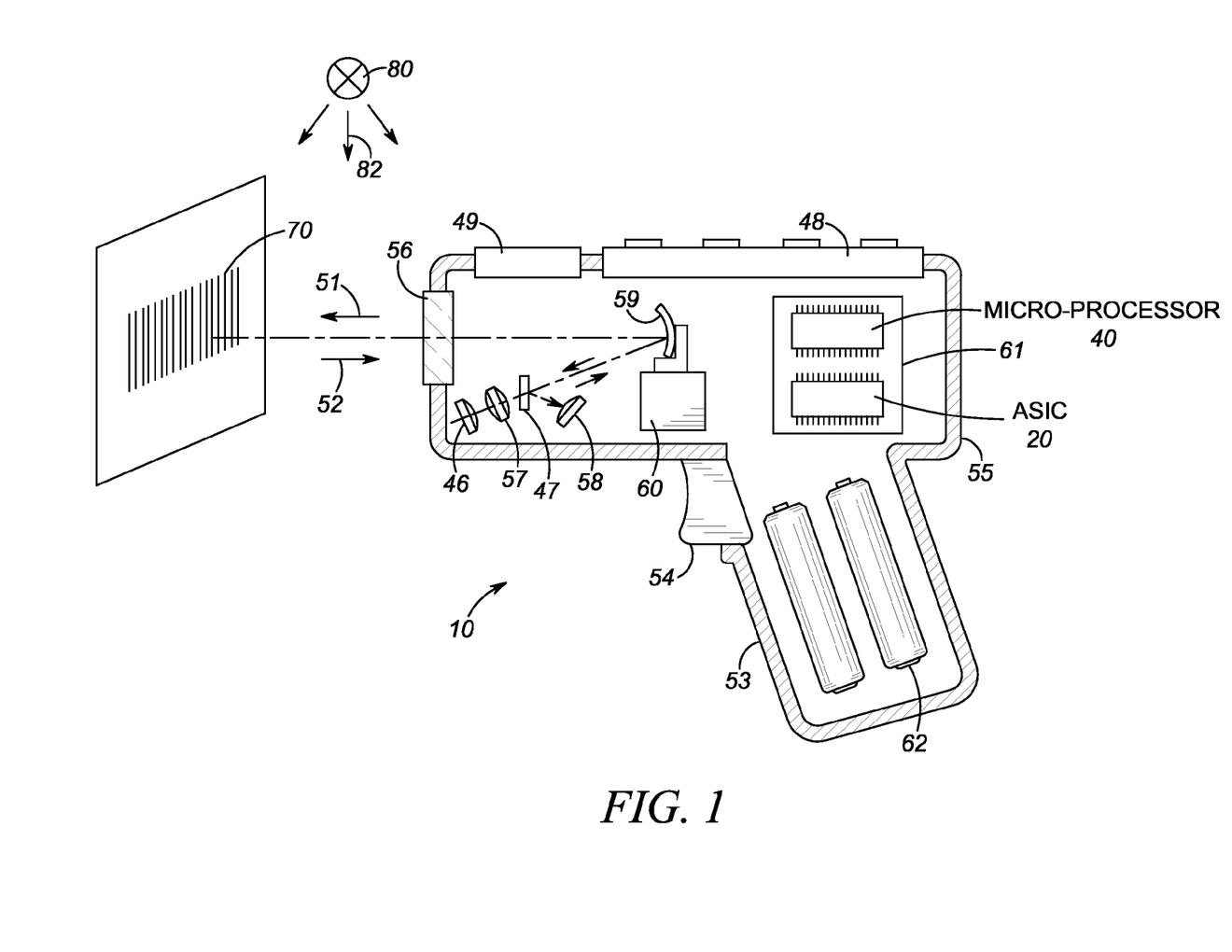
FIG. 1 is a schematic view of a handheld moving laser beam reader apparatus operative for electro-optically reading a target in the presence of ambient light in accordance with the present disclosure.

Turning now to the drawings, FIG. 1 depicts a handheld, moving laser beam apparatus or reader 10 implemented in a gun-shaped housing 55 having a pistol-grip type of handle 53. The housing 55 contains a laser light source 46, preferably a semiconductor laser diode, for emitting an outgoing laser beam 51 to a target, such as a bar code symbol 70, for reflection and scattering therefrom; a detector 58 for detecting incoming light 52; a focusing optical assembly 57, preferably one or more focusing lenses, for focusing the outgoing laser beam 51 as a beam spot on the symbol 70; an application specific integrated circuit (ASIC) 20 mounted on a printed circuit board (PCB) 61; a programmed microprocessor or controller 40, also preferably mounted on the PCB 61; and a power source or battery 62, preferably mounted in the handle 53. A light-transmissive window 56 at a front end of the housing 55 allows the outgoing laser light beam 51 to exit the housing 55, and the incoming light 52 to enter the housing 55. A user holds the reader 10 by the handle 53, and aims the reader 10 at the symbol 70, preferably at a distance away from the symbol 70. To initiate reading, the user pulls a trigger 54 on the handle 53. The reader 10 may optionally include a keyboard 48 and a display 49 readily accessible to the user.

Figure 2:
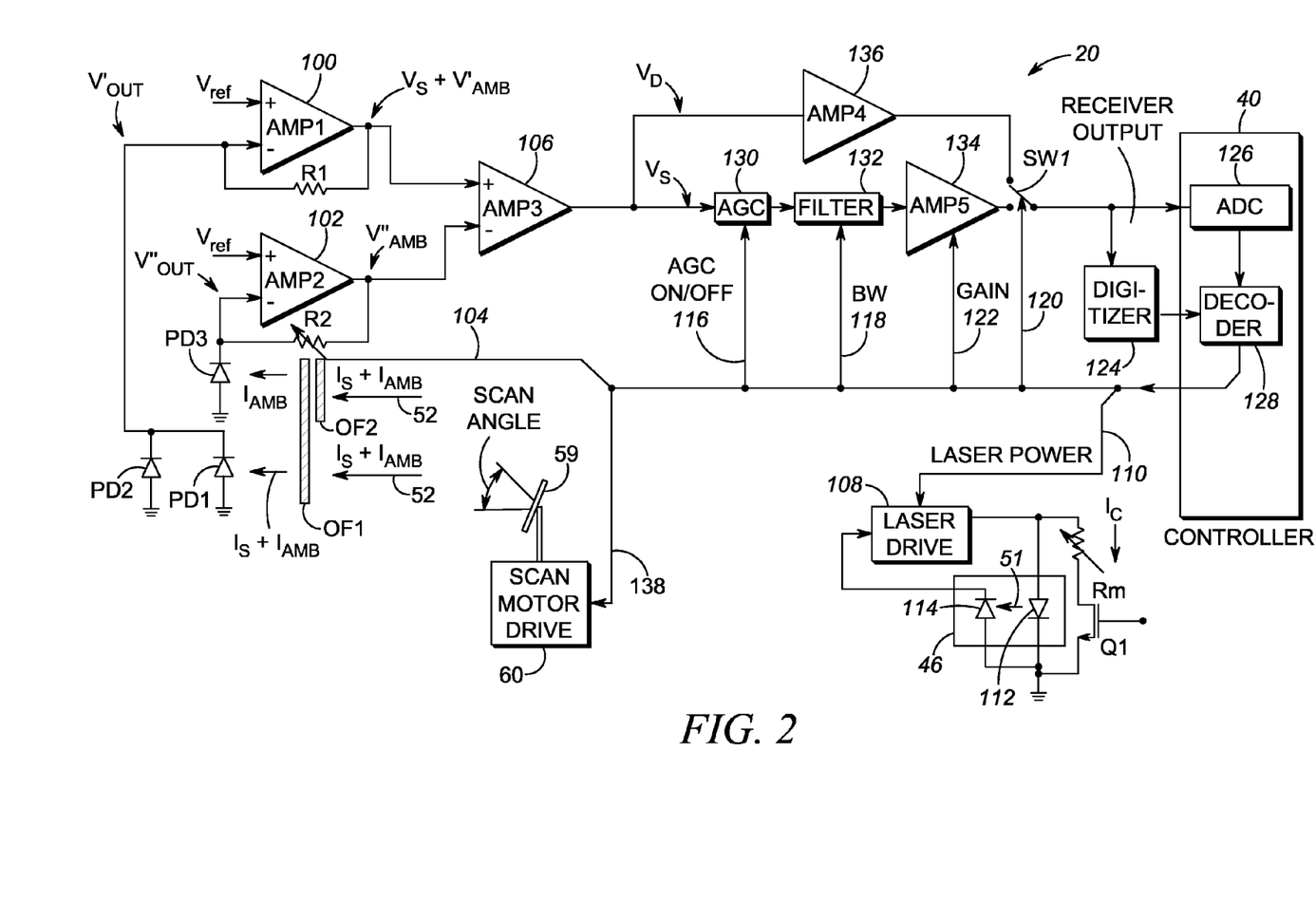
FIG. 2 is an electrical circuit schematic of a signal processing receiver circuit for use in the apparatus of FIG. 1.

As further depicted in FIG. 1, the laser beam 51 emitted by the laser light source 46 passes through a partially-silvered mirror 47 to a scan component or oscillating scan mirror 59, which is coupled to a drive motor 60, preferably energized when the trigger 54 is manually pulled. The oscillation of the mirror 59 causes the outgoing laser beam 51 to sweep back and forth over a scan angle (see FIG. 2) in a desired scan pattern, e.g., a scan line, across the symbol 70. A variety of mirror and motor configurations can be used to move the laser beam in the desired scan pattern. For example, the mirror 59 need not be a concave mirror as illustrated in FIG. 1, but could be a planar mirror as illustrated in FIG. 2, that is repetitively and reciprocally driven in alternate circumferential directions over the scan angle about a drive shaft on which the planar mirror is mounted. By way of non-limiting numerical example, the scan angle can be on the order of 50 degrees during a default mode of operation.

As depicted in FIGS. 1-2, the incoming light 52 may have two light components ($I_S$, $I_{AMB}$) that come from two different sources. The first light component $I_S$ is return laser light derived from the laser light source 46 and is generated by reflection and/or scattering of the laser light beam 51 back by the symbol 70 through the window 56. The second light component $I_{AMB}$ is ambient light 82 derived from an external ambient light source 80 operative for emitting the ambient light 82. As described above, the external light source 80 at a venue can be sunlight, one or more incandescent bulbs, one or more fluorescent lamps, one or more light emitting diodes (LEDs), and the like. In the exemplary reader 10 shown in FIG. 1, the incoming light 52 reflects off of the scan mirror 59 and the partially-silvered mirror 47 and impinges on the detector 58. The detector 58 produces an analog electrical output signal ($V_{OUT}$) proportional to the intensity of the incident return light 52. A first component signal of the output signal $V_{OUT}$ of the return light 52 that is returned from the symbol 70 and that is derived from the laser light from the laser light source 46 is hereinafter described as an "information" signal ($V_S$) bearing information related to the symbol 70. A second component signal of the output signal $V_{OUT}$ of the return light 52 that is derived from the ambient light source 80 is hereinafter described as an "ambient light" or "interfering" signal ($V_{AMB}$).

As also described above, when fluorescent lamps and LEDs are operated at kilohertz frequencies, then the analog electrical ambient light signal $V_{AMB}$ has a constant illumination DC component and a relatively large time-varying AC frequency component at kilohertz frequencies, typically anywhere from 30 kHz to 300 kHz. There are circumstances where the amplitude of the ambient light signal $V_{AMB}$ is too large in comparison to that of the information signal $V_S$, and there are also circumstances where the time-varying frequency component of the ambient light signal $V_{AMB}$ is too close in frequency to the frequency of the information signal $V_S$, in which events the ambient light signal $V_{AMB}$ can interfere and impede the decoding of the information signal $V_S$, thus degrading the performance of the reader 10. By way of non-limiting example, an information signal $V_S$ of about 50 kHz and its harmonic of about 100 kHz can be generated during reading of a low density symbol 70 located relatively close to the reader 10, e.g., about 10 inches away. If the LEDs are operated at about 100 kHz, then ambient light signal $V_{AMB}$ will have a frequency of about 100 kHz and its harmonic will have a frequency of about 200 kHz. The 100 kHz frequencies of the ambient light signal $V_{AMB}$ and the information signal $V_S$ are too close and will cause an interference, and perhaps cause the symbol 70 not to be successfully read. One aspect of this disclosure is to remove the adverse effects of such interference.

As shown in FIG. 2, the detector 58 advantageously includes a first filtering system, e.g., a first optical filter OF1, for passing the return laser light $I_S$ from the target and the ambient light $I_{AMB}$; a first photodetector system, e.g., a plurality of photodiodes PD1, PD2, for receiving the return laser light $I_S$ and the ambient light $I_{AMB}$ passed by the first optical filter OF1, and for generating a first analog electrical output signal $VN_{OUT}$ constituted of the information signal $V_S$ bearing information related to the target 70 from the return laser light, and a first ambient light signal $VN_{AMB}$ from the ambient light; a second filtering system, e.g., a second optical filter OF2 in combination with the first optical filter OF1, for passing the ambient light $I_{AMB}$; and a second photodetector system, e.g., a photodiode PD3, for receiving the ambient light $I_{AMB}$ passed by the optical filters OF1, OF2, and for generating a second analog electrical output signal $VO_{OUT}$ constituted of a second ambient light signal $VO_{AMB}$ from the ambient light. As used herein, the term "photodetector system" is intended to include not only one or more photodiodes, but also, one or more photosensitive areas on a substrate.

Figure 3:
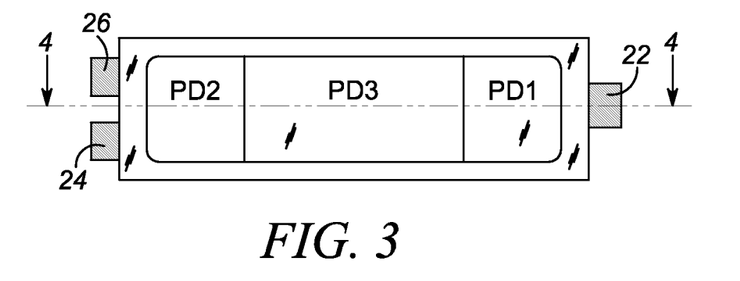
FIG. 3 is a top plan view depicting one embodiment of a detector employed in FIG. 2.

As shown in FIG. 3, in one practical implementation, the photodiodes PD1, PD2, PD3 are arranged in a linear row. Photodiode PD3 is in the center of the row and has a light collection area advantageously substantially equal to the sum of the light collection areas of the photodiodes PD1 and PD2. Thus, in an optimized solution, the photosensitive area of each photodiode is scaled to balance photodetector currents according to the total radiant flux from ambient light that is expected to reach each photosensitive area. All of the anodes of the photodiodes PD1, PD2, PD3 are connected together at terminal 22. The cathodes of the photodiodes PD1, PD2 are connected together at terminal 24. The cathode of the photodiode PD3 is connected to terminal 26. As used herein, the term "photodetector system" is intended to include not only one or more photodiodes, but also, one or more photosensitive areas on a substrate.

Figure 4:
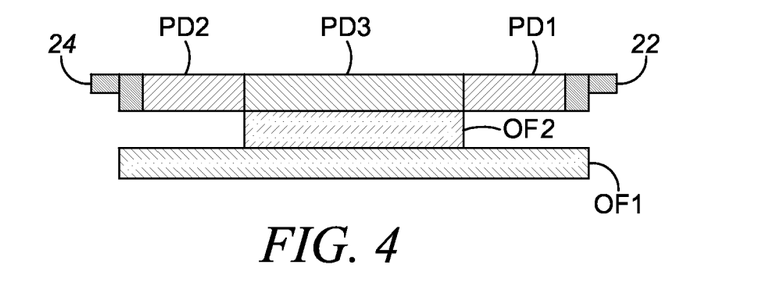
FIG. 4 is a sectional view taken on line 4-4 of FIG. 3.
Figure 5:
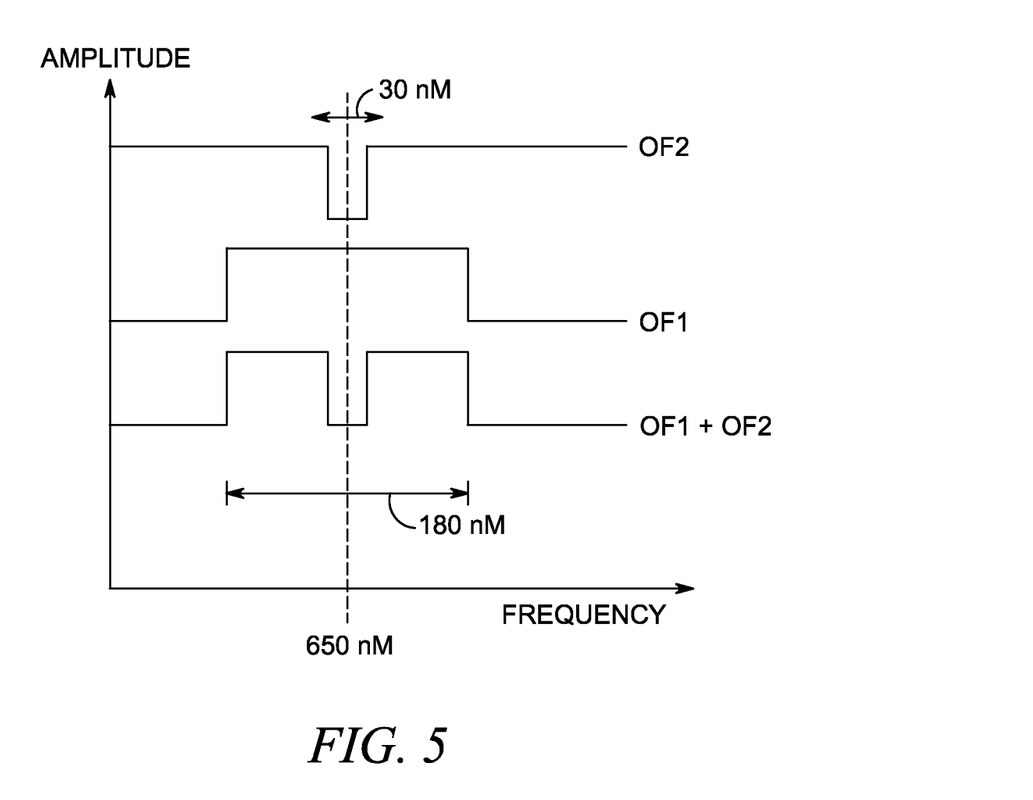
FIG. 5 is a diagram depicting the characteristics of optical filters employed in the detector of FIGS. 2-4.

As shown in FIG. 4, the first optical filter OF1 overlies all the photodiodes PD1, PD2, PD3, and the second optical filter OF2 only overlies the photodiode PD3. As shown in FIG. 5, in the case of a red laser light source 46, the output laser frequency is about 650 nm K15 nm. The first optical filter OF1 has a wide frequency passband of, for example, 180 nm, for passing the laser frequency and a frequency of the ambient light $I_{AMB}$. The second optical filter OF2 has a narrow frequency stopband for attenuating and blocking the laser frequency (and ambient light signals that are very close in frequency to the laser frequency) and for passing the frequency of the ambient light $I_{AMB}$. The passband of the combination of the optical filters OF1, OF2 is also shown. In FIG. 5, it is assumed that the radiant flux is about equal on the two photodetector systems, i.e., PD1+PD2=PD3. This relationship would change if different passband and/or stopband properties were desired.

Returning to FIG. 2, the ASIC 20, includes a signal processing receiver circuit connected to the photodiodes PD1, PD2, which, as described above, outputs the first output signal $VN_{OUT}$, and to the photodiode PD3, which, as also described above, outputs the second output signal $VO_{OUT}$. The signal processing receiver circuit includes a first amplifier (AMP1) 100, advantageously configured as a transimpedance amplifier having a resistor R1, to increase the gain of the first output signal $VN_{OUT}$ received from the photodiodes PD1, PD2, and further includes a second amplifier (AMP2) 102, advantageously also configured as a transimpedance amplifier having a resistor R2, to increase the gain of the second output signal $VO_{OUT}$ received from the photodiode PD3. The gain of at least one of the amplifiers, (as shown, the amplifier AMP2), is adjusted by varying the resistor R2 via a control line 104 connected to the controller 40. The amplified first output signal $VN_{OUT}$ and the amplified second output signal $VO_{OUT}$ are conducted to a differencing amplifier (AMP3) 106 operative for subtracting the amplified second output signal $VO_{OUT}$ from the amplified first output signal $VN_{OUT}$, as described below.

The signal processing receiver circuit 20 has two modes of operation. In a setup or calibration mode of operation, the information signal $V_S$ is made equal to zero. This can be performed, for example, by deenergizing the laser light source 46. Thus, as shown in FIG. 2, the controller 40 also controls the laser light source 46 with a laser drive circuit 108 via a control line 110. The laser drive circuit 108 includes a laser power regulator, which is a closed loop feedback system that maintains a constant optical output power by varying the applied forward current $I_C$ to the laser light source 46. The laser light source 46 includes a laser diode 112 and a monitor photodiode 114. A small fraction of the output laser light is coupled into the monitor photodiode 114 within the enclosed laser light source 46. This induces a photocurrent in the monitor photodiode 114 that is proportional to the laser output power. This photocurrent is a negative feedback signal that is used to regulate the laser's output power. Thus, the controller 40 can either turn the laser light source 46 on to an energized state, or turn the laser light source 46 off to a deenergized state. In the energized state, the laser light source 46 can either be continuously energized, or pulsed or modulated with the laser drive circuit 108 via the control line 110 so that a modulated current is conducted to the laser light source 46. The laser light source 46 is typically pulsed at a rate or frequency sufficiently fast to accurately resolve the narrowest bar or space used in the type of bar code symbol 70 to be read. Typically, this amounts to several pulses during the period of time required for the scanning laser beam to scan across the narrowest bar or space of the bar code symbol 70. If the laser light source 46 is pulsed, then a demodulator (not illustrated) is advantageously provided in the receiver circuit 20.

As also shown in FIG. 2, the controller 40 also controls the drive motor 60 over a control line 138. The drive motor 60 sweeps the scan component or oscillating scan mirror 59 over a scan angle, which, as noted above, can be about 50 degrees in a default mode of operation. In the setup or calibration mode of operation, the scan mirror 59 is not swept, i.e., is held stationary. Hence, this is another way to make the information signal $V_S$ equal to zero.

In the setup or calibration mode of operation (when $V_S$=0), the first output signal $VN_{OUT}$ (=$VN_{AMB}$) and the second output signal $VO_{OUT}$ (=$VO_{AMB}$) are conducted to the differencing amplifier (AMP3) 106 operative for subtracting the second output signal $VO_{OUT}$ from the first output signal $VN_{OUT}$ to obtain a difference signal $V_D$. The difference signal $V_D$ has a non-negligible amplitude due to differences in the first and second ambient light signals $VN_{AMB}$, $VO_{AMB}$ caused by differences in the first and second filtering systems and/or differences in the first and second photodetector systems and/or differences in the first and second amplifiers 100, 102, as well as due to a non-uniform ambient light spectrum incident on the first and second photodetector systems. The difference signal $V_D$ is conducted to another amplifier (AMP4) 136 and to a control switch SW1 operative, in the illustrated first switching state, to conduct the difference signal $V_D$ to the controller 40 to determine and store an ambient light threshold level. Thereupon, the controller 40, as described above, varies the resistor R2 via the control line 104 to adjust the gain of the amplifier 102 to null the difference signal $V_D$ by substantially equalizing the first and second ambient light signals.

Once the first and second ambient light signals have been substantially equalized, the controller 40 energizes the laser light source 46, and/or sweeps the scan component 59, and switches the control switch SW1 to a second switching state via the control line 120, to define the default mode of operation. Now, the first output signal $VN_{OUT}$ (=$V_S$+$VN_{AMB}$) and the second output signal $VO_{OUT}$ (=$VO_{AMB}$) are conducted to the differencing amplifier (AMP3) 106 operative for subtracting the second output signal $VO_{OUT}$ from the first output signal $VN_{OUT}$ to obtain a difference signal $V_D$ (=$V_S$). In other words, the output of the differencing amplifier (AMP3) 106 is substantially constituted only of the information signal $V_S$.

The information signal $V_S$ is now conducted to an automatic gain controller 130 (AGC) having an on/off control input under the control of the microprocessor 40 over control line 116, at least one active low-pass filter 132 having an adjustable bandwidth (BW) under the control of the microprocessor 40 over control line 118, and at least one amplifier 134 (AMP5) having an adjustable gain to increase the gain of the output signal under the control of the microprocessor 40 over control line 122.

The signal processing receiver circuit 20 also includes a digitizer 124 which digitizes the output signal from the amplifier 134 by processing the output signal with differentiating circuits, peak detectors, multiplexers, logic elements, and comparators. The digitizer 124 processes the output signal to produce a pulse signal where the widths and spacings between the pulses correspond to the widths of the bars and the spacings between the bars of the symbol 70. The digitizer 124 serves as an edge detector or wave shaper circuit, and threshold points set by the digitizer 124 determines what points of the output signal represent bar edges. The pulse signal from the digitizer 124 is applied to a decoder 128, typically incorporated as software in the programmed controller 40, which will also have associated program memory and random access data memory. The controller 40 also has an analog-to-digital converter (ADC) 126 connected to the decoder 128 and to the output of the amplifier 134. The decoder 128 first determines the pulse widths and spacings of the output signal from the digitizer 124. The decoder 128 then analyzes the widths and spacings to find and decode a legitimate bar code symbol. This includes analysis to recognize legitimate characters and sequences, as defined by the appropriate code standard or symbology. The controller 40 then communicates with an external host over an interface.

As previously described, the measurement of the difference in the ambient light signals is advantageously performed in the deenergized state of the laser light source 46. This measurement may be performed during the calibration mode as described above, or can also be subsequently performed during a reading session in the default mode, for example, by periodically momentarily turning the laser light source 46 off during a short time interval, e.g., about 1 ms, in a center or other part of a scan line, once every twenty scans or so. In addition, the information signal $V_S$ need not be zero in the calibration mode. As described above, the difference signal $V_D$ can be nulled even when the laser light source 46 is energized and even while the scan mirror 59 is being swept, because the controller can typically find a gain setting that results in a minimum difference signal $V_D$ even if the information signal $V_S$ is present.

Figure 6A:
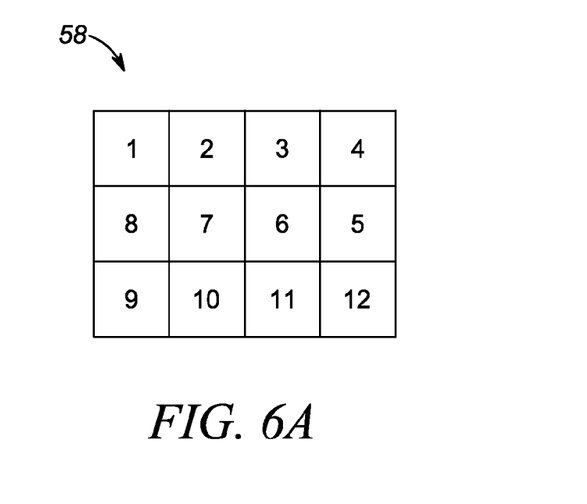
FIG. 6A is a diagrammatic top plan view of another embodiment of a detector that may be employed in FIG. 2.
Figure 6B:
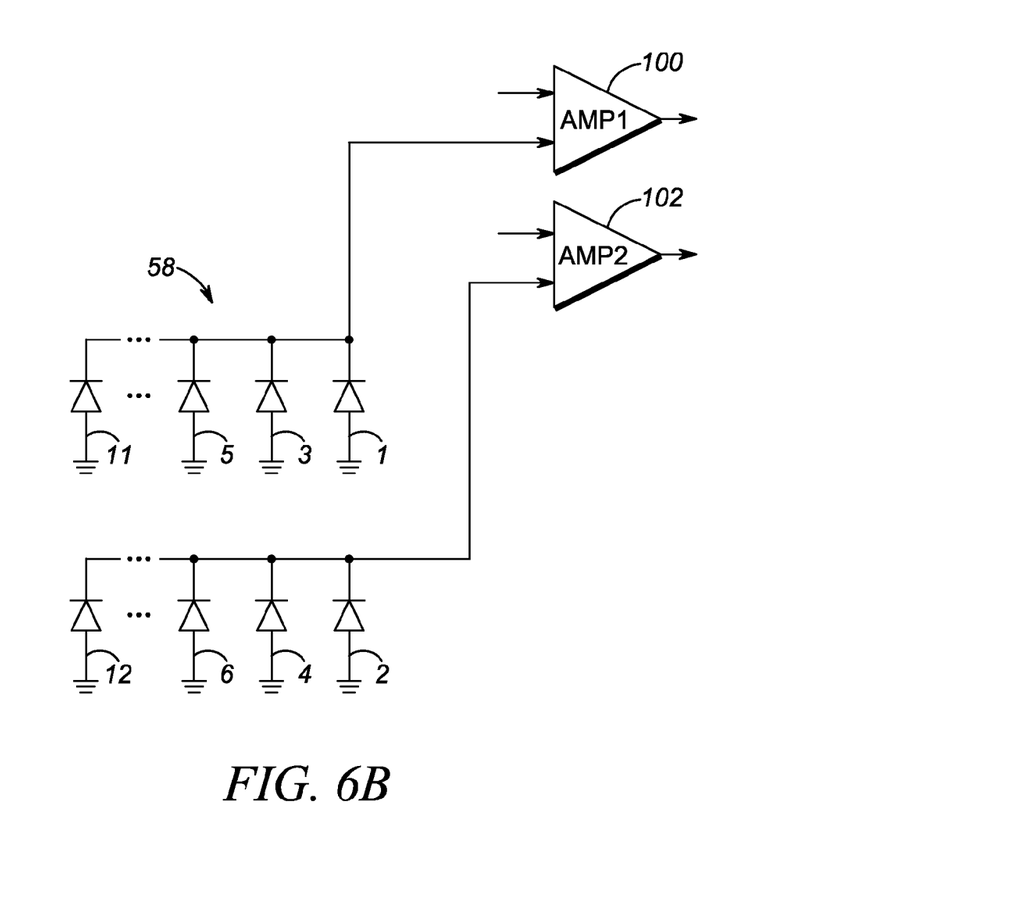
FIG. 6B is an electrical circuit schematic thereof.

Turning now to FIG. 6A, in another practical implementation, the detector 58 includes a plurality of photodiodes 1-12 arranged in an array of mutually orthogonal rows and columns. Any number of rows or columns may be used. As shown in FIG. 6B, the first photodetector system includes the odd-numbered photodiodes, and the second photodetector system includes the even-numbered photodiodes. As before, the first optical filter OF1 will cover all the photodiodes 1-12, while individual second optical filters OF2 will cover only the even-numbered photodiodes 2, 4, 6, 8, 10, 12.

As described above, the term "photodetector system" includes not only one or more photodiodes, but also, one or more photosensitive areas on a substrate. Advantageously, the one-dimensional photodiode array of FIG. 3 and the two-dimensional photodiode array of FIG. 6A can each be produced from wafer-scale processing, where each die is a respective array on a common silicon substrate.

Figure 7:
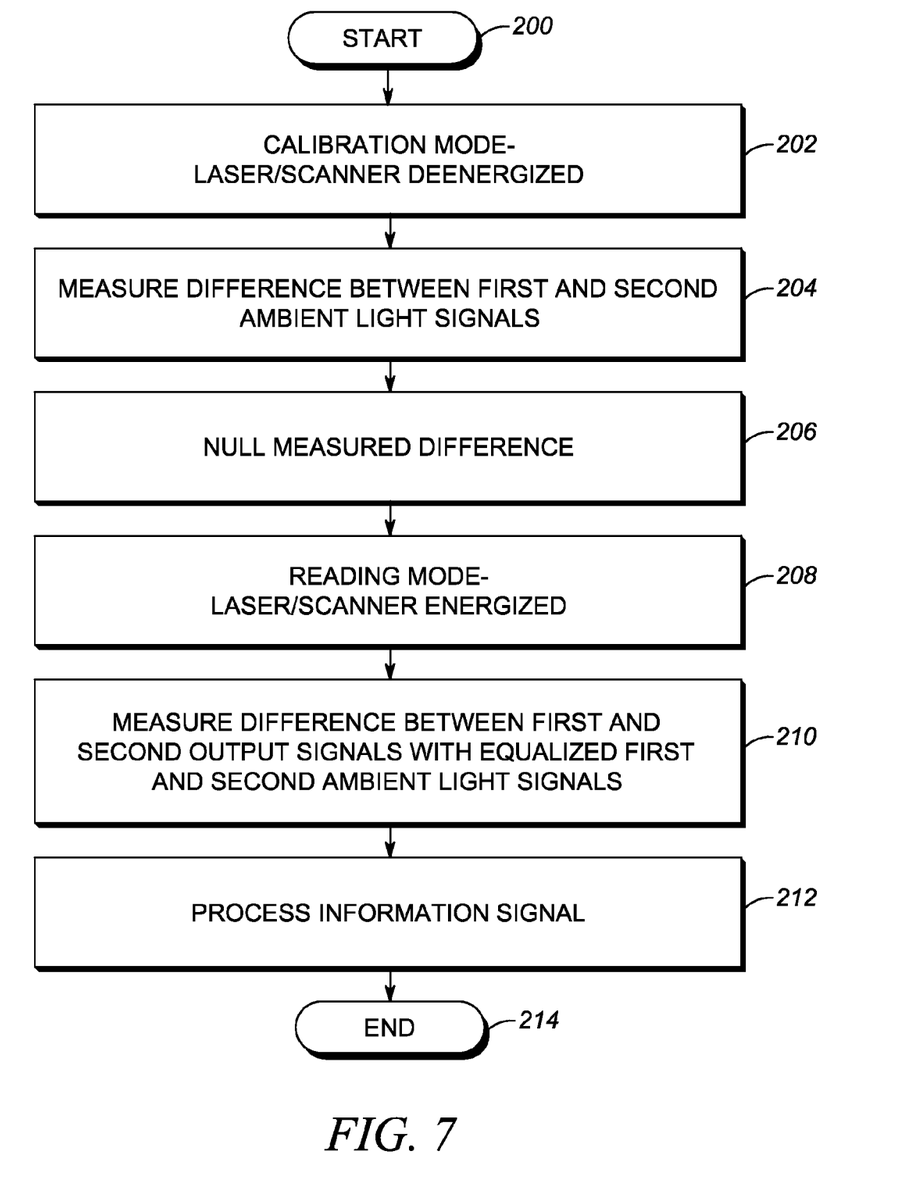
FIG. 7 is a flow chart depicting steps performed in accordance with the method of the present disclosure.

As depicted in the flow chart of FIG. 7, beginning a reading session at start step 200, the laser light source 46 and/or the scan motor drive 60 is deenergized in a calibration mode in step 202, and the difference between the first and second ambient light signals is measured in step 204. Then, in step 206, when the measured difference exceeds a threshold, the measured difference is nulled. Then, in step 208, the laser light source 46 and/or the scan motor drive 60 is energized in a reading mode, and the difference between the first and second output signals is measured with the first and second ambient light signals equalized in step 210. Then, the information signal is processed in step 212, after which the reading session ends at step 214.

As described herein, the ambient light may be derived from LEDs in lighting fixtures at the venue, as well as from communication systems that include light modulators for transmitting data. In one known application, for example, overhead lighting, as part of a positioning system, is operative to transmit an information signal to a cell phone camera using pulse width modulation (PWM) of the light output. In a moving laser beam reader, a large PWM light signal creates a strong interference that can be significantly reduced by using the present invention. Adding a continuous-time information signal to the LED current directly, instead of chopping the LED current directly, instead of chopping the LED current with a PWM signal, eliminates such potential interference while the communications system benefits from a large improvement, about two times, in the signal-to-noise ratio. Put another way, PWM is a wasteful technique, because energy is lost in the modulation process.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A reader for electro-optically reading a target in the presence of ambient light, comprising:
   a laser for emitting a laser beam;
   a scan component for scanning the laser beam across the target for reflection and scattering therefrom as return laser light;
   a first filtering system for passing the return laser light from the target and the ambient light;
   a first photodetector system for receiving the return laser light and the ambient light passed by the first filtering system, and for generating a first analog electrical output signal constituted of an information signal bearing information related to the target from the return laser light, and a first ambient light signal from the ambient light;
   a second filtering system for passing the ambient light;
   a second photodetector system for receiving the ambient light passed by the second filtering system, and for generating a second analog electrical output signal constituted of a second ambient light signal from the ambient light;
   signal processing circuitry including a controller for measuring a difference between the first and second ambient light signals, the signal processing circuitry being operative for substantially equalizing the first and second ambient light signals when the difference exceeds a threshold, and for subtracting the second output signal from the first output signal when the first and second ambient light signals are equalized to obtain a receiver output signal substantially constituted only of the information signal;
   wherein the laser beam has a laser frequency, wherein the first filtering system has a first optical filter having a frequency passband for passing the laser frequency and a frequency of the ambient light, and wherein the second filtering system has a second optical filter having a frequency passband for attenuating the laser frequency and for passing the frequency of the ambient light; and wherein the first optical filter overlies the first and second photodetector systems, and wherein the second optical filter only overlies the second photodetector system.

2. The reader of claim 1, wherein the first photodetector system includes a plurality of photodiodes arranged in a linear row.

3. The reader of claim 1, wherein the first photodetector system includes a plurality of photodiodes arranged in an array of mutually orthogonal rows and columns.

4. The reader of claim 1, wherein the signal processing circuitry includes a first amplifier for amplifying the first output signal, and a second amplifier for amplifying the second output signal, and wherein at least one of the amplifiers has an adjustable gain, and wherein the controller is operative for adjusting the gain of the at least one amplifier until the first and second ambient light signals are equalized in magnitude.

5. The reader of claim 4, wherein the signal processing circuitry includes a differencing amplifier for subtracting the second output signal from the first output signal when the first and second ambient light signals are equalized.

6. The reader of claim 1, wherein the signal processing circuitry includes a control switch having two switching states, and wherein the controller is operative for switching the control switch to one of the switching states in which the difference is measured, and to the other of the switching states in which the receiver output signal is obtained.

7. The reader of claim 1, wherein the signal processing circuitry includes an automatic gain circuit (AGC), a receiver filter having an adjustable bandwidth, and at least one receiver amplifier having an adjustable gain; and wherein the controller is operative for turning the AGC on or off, for adjusting the bandwidth of the receiver filter, and for adjusting the gain of the at least one receiver amplifier; and wherein the signal processing circuitry further includes a digitizer for digitizing the information signal to generate a digitized signal, and wherein the controller is operative for decoding the digitized signal.

8. An electro-optical assembly, comprising:
a substrate;
a first optical filter supported by the substrate and having a frequency passband for passing a laser frequency of laser light and a frequency of ambient light;
a first photodetector system supported by the substrate and operative for receiving the laser light and the ambient light passed by the first optical filter, and for generating a first analog electrical output signal constituted of an information signal bearing information related to the laser light, and a first ambient light signal from the ambient light;
a second optical filter supported by the substrate and having a frequency passband for attenuating the laser frequency and for passing the frequency of the ambient light;
a second photodetector system supported by the substrate and operative for receiving the ambient light passed by the second optical filter, and for generating a second analog electrical output signal constituted of a second ambient light signal from the ambient light; and
wherein the first optical filter overlies the first and second photodetector systems, and wherein the second optical filter only overlies the second photodetector system.

9. A method of electro-optically reading a target in the presence of ambient light, comprising:
emitting a laser beam from a laser;
scanning the laser beam across the target for reflection and scattering therefrom as return laser light;
passing the return laser light from the target and the ambient light through a first filtering system;
receiving the return laser light and the ambient light passed by the first filtering system at a first photodetector system;
generating by the first photodetector system a first analog electrical output signal constituted of an information signal bearing information related to the target from the return laser light, and a first ambient light signal from the ambient light;
passing the ambient light through a second filtering system;
receiving the ambient light passed by the second filtering system at a second photodetector system;
generating by the second photodetector system a second analog electrical output signal constituted of a second ambient light signal from the ambient light;
measuring a difference between the first and second ambient light signals;
substantially equalizing the first and second ambient light signals when the difference exceeds a threshold;
subtracting the second output signal from the first output signal when the first and second ambient light signals are equalized to obtain a receiver output signal substantially constituted only of the information signal;
configuring the first filtering system with a first optical filter having a frequency passband for passing a laser frequency of the laser and a frequency of the ambient light, and configuring the second filtering system with a second optical filter having a frequency passband for attenuating the laser frequency and for passing the frequency of the ambient light; and
overlying the first and second photodetector systems with the first optical filter, and overlying only the second photodetector system with the second optical filter.

10. The method of claim 9, and arranging the first photodetector system as a plurality of photodiodes in a linear row.

11. The method of claim 9, and arranging the first photodetector system as a plurality of photodiodes in an array of mutually orthogonal rows and columns.

12. The method of claim 9, and amplifying the first output signal with a first amplifier, and amplifying the second output signal with a second amplifier, and adjusting a gain of at least one of the amplifiers until the first and second ambient light signals are equalized in magnitude.

13. The method of claim 12, wherein the subtracting of the second output signal from the first output signal is performed with a differencing amplifier when the first and second ambient light signals are equalized.

14. The method of claim 9, and switching a control switch to one switching state in which the difference is measured, and to another switching state in which the receiver output signal is obtained.

15. The method of claim 9, and turning an automatic gain circuit (AGC) on or off, and adjusting a bandwidth of a receiver filter, and adjusting a gain of at least one receiver amplifier; and digitizing the information signal to generate a digitized signal, and decoding the digitized signal.

* * * * *